US006955696B1

(12) United States Patent
Ost et al.

(10) Patent No.: US 6,955,696 B1
(45) Date of Patent: Oct. 18, 2005

(54) FILTER FRAME AND ASSEMBLY

(75) Inventors: Lawrence H. Ost, Inverness, IL (US);
Brandon H. Ost, St. Charles, IL (US);
Hershel E. Beck, Crestwood, KY (US);
Philip J. Winters, Lockport, IL (US)

(73) Assignee: Filtration Group, Inc., Joliet, IL (US)

( * ) Notice: Subject to any disclaimer, the term of this patent is extended or adjusted under 35 U.S.C. 154(b) by 51 days.

(21) Appl. No.: 10/631,201

(22) Filed: Jul. 31, 2003

(51) Int. Cl.[7] .......................... B01D 29/07; B01D 46/10
(52) U.S. Cl. ......................... 55/357; 55/484; 55/497; 55/511; 55/DIG. 31; 210/470; 210/483; 210/498
(58) Field of Search .......................... 55/357, 482, 484, 55/492, 497, 502.5, 11, DIG. 31, 495, 502; 210/470, 471, 483–485, 498

(56) References Cited

U.S. PATENT DOCUMENTS

| | | | | |
|---|---|---|---|---|
| 1,377,721 A | * | 5/1921 | Owen et al. ................ 55/492 |
| 1,521,576 A | * | 12/1924 | Wittemeier ................ 55/484 |
| 2,016,033 A | | 10/1935 | Christoffeson | |
| 2,062,649 A | * | 12/1936 | Hegan ...................... 55/305 |
| 2,230,765 A | | 2/1941 | Shimer | |
| 2,771,154 A | | 11/1956 | Gonzalez | |
| 2,969,127 A | * | 1/1961 | Cook ......................... 96/58 |
| 3,246,456 A | * | 4/1966 | Sharp ...................... 55/481 |
| 3,247,652 A | * | 4/1966 | Annas et al. ............... 55/481 |
| 3,368,331 A | * | 2/1968 | Baxendale ................ 55/299 |
| 3,385,033 A | * | 5/1968 | Basore et al. ............. 55/302 |
| 3,470,680 A | * | 10/1969 | Avera ...................... 55/497 |
| 3,774,377 A | | 11/1973 | Bishop | |
| 4,125,386 A | | 11/1978 | Philipp | |
| 4,193,780 A | | 3/1980 | Cotton, Jr. et al. | |
| 4,277,267 A | * | 7/1981 | Posner ..................... 55/494 |
| 4,376,053 A | * | 3/1983 | Bullock et al. ........... 210/767 |
| 4,678,489 A | | 7/1987 | Bertelsen | |
| 4,897,187 A | * | 1/1990 | Rice ....................... 210/137 |
| 5,039,410 A | * | 8/1991 | Gershenson ............. 210/232 |
| 5,045,194 A | * | 9/1991 | Gershenson ............. 210/232 |
| 5,117,899 A | | 6/1992 | Skimehorn | |
| 5,482,624 A | * | 1/1996 | Swiatek et al. .......... 210/238 |
| 6,235,195 B1 | * | 5/2001 | Tokar ...................... 210/238 |
| 6,294,004 B1 | | 9/2001 | Summers et al. | |
| 2003/0217534 A1 | * | 11/2003 | Krisko et al. ............. 55/337 |

* cited by examiner

Primary Examiner—Robert H. Spitzer
(74) Attorney, Agent, or Firm—Vedder Price Kaufman & Kammholz

(57) ABSTRACT

A filter frame including a panel having a plurality of V-shaped elements disposed on the first side thereof. Each V-shaped element includes a pair of slots each configured to receive and orient a filter element. A portion of the panel disposed between adjacent pairs of V-shaped elements has an opening form therein to define a handle for carrying the filter frame.

31 Claims, 5 Drawing Sheets

FILTER FRAME AND ASSEMBLY

BACKGROUND OF THE INVENTION

The invention relates generally to filter element supports, and in particular to a filter frame assembly for supporting a plurality of filter elements and including a handle for carrying.

Prior art filter assemblies are known. For example, U.S. Pat. No. 4,193,780, issued to Cotton, Jr. et al., describes a plurality of separate V-shaped wire mesh members arranged and connected in side-by-side relationship to provide a plurality of V-shaped cells disposed across an air stream. A stabilizer bar extends across and attaches to the exposed edges of the V-shaped cells to support the cells in a proper relation and retain the filter media in place. Additionally, the stabilizer bar stabilizes the frames to decrease vibration and rattle when the system is operating. No handle is provided for carrying the filter assembly.

U.S. Pat. No. 2,016,033, issued to Christofferson, describes an air filter, which has filter media disposed between a pair of V-shaped support members. A plurality of the V-shaped filters may be arranged side-by-side in a filter array. Each of the V-shaped filters is independently removable and replaceable. A handle or pair of handles are provided and extend into the central portion of the V-shaped area to facilitate insertion and removal of the filter with respect to the array. No handle is provided for carrying the array.

One disadvantage of the above and other prior art designs is that because of the size of the filter assemblies/arrays often used in large commercial or industrial applications, the filter arrays are difficult to carry and position for installation. Usually, an installer grasps the filter assembly/array at one of the vertex points of the V-shaped members. The palm of the installer is disposed at the vertex of the V-shape and the installers fingers grasp the filter media. As a result, the filter media is usually damaged. Christofferson provides handles for removing individual filter elements. However, these handles are not useful when moving or installing the filter array.

Therefore, there is a need for a filter frame having a convenient handle that is relatively easy to manufacture, low cost, light weight and may be used with another filter frame to define a filter frame assembly.

BRIEF DESCRIPTION OF THE DRAWINGS

The invention may be best understood by reference following the description taking in conjunction with the accompanying drawings, and the several figures of which like reference numerals identify like elements.

DETAILED DESCRIPTION OF THE PREFERRED EMBODIMENTS OF THE INVENTION

Figure 1:
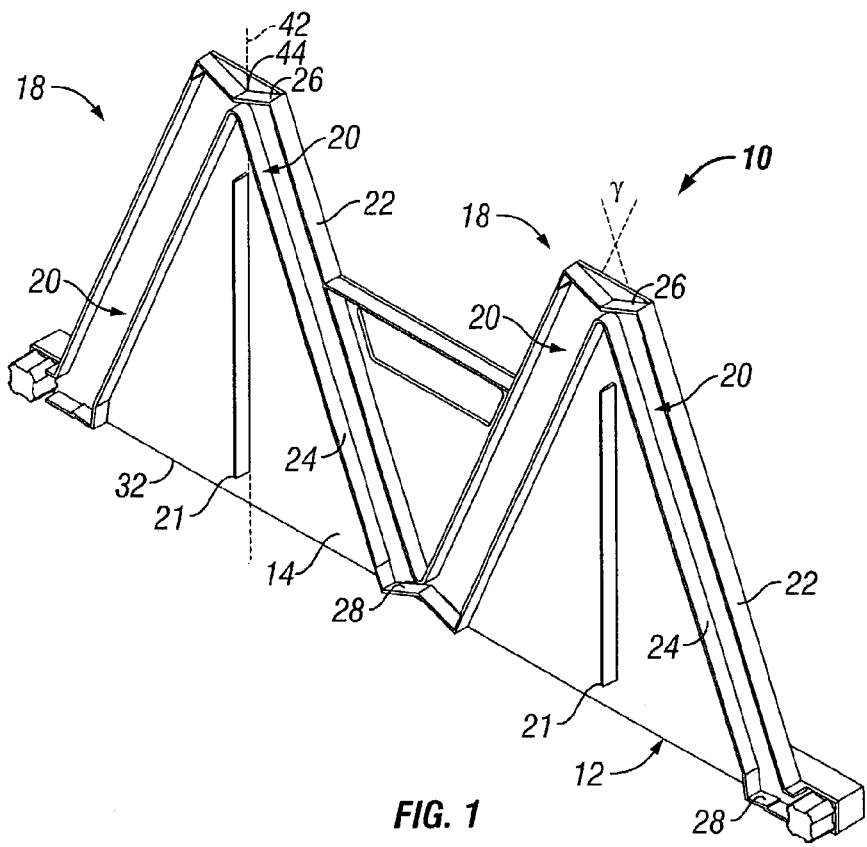
FIG. 1 is a first side perspective view of a filter frame in accordance with one embodiment of the present invention.

The filter frame assembly of the present invention is primarily for use in air filtration systems. In one principal aspect of the present invention, a filter frame includes a panel including a plurality of V-shaped elements disposed on a first side of the panel. Each V-shaped element includes a pair of slots. The slots are each configured to receive and orient a filter element. A portion of the panel disposed between adjacent pairs of V-shaped elements has an opening formed therein to define a handle for carrying the filter frame.

In one embodiment, a rib is disposed on the first side of the panel between the slots of each V-shaped element extending along the line passing through a vertex of the V-shaped element and normal to a base of the panel for reinforcing the panel. In another embodiment, a rail is disposed on a second side of the panel at a base thereof having an extent greater than the base. In still another embodiment, a connector is disposed at each end of the rail extending toward the first side of the panel. In yet another embodiment, each slot is defined by a plurality of flanges extending from the first side of the panel. In still yet another embodiment, the slots of each V-shaped element are disposed at a relative angle of less than 180 degrees. In a still yet further embodiment, the handle further includes a support element normal to the panel and extending toward the first or second side of the panel between the V-shaped elements. In yet another still further embodiment, the slots of each V-shaped element are configured to define a continuous channel.

In another principal aspect of the present invention, a filter frame includes a generally W-shaped panel including a pair of V-shaped elements disposed on the first side of the panel. Each V-shaped element includes a pair of slots configured to receive an oriented pair of filter elements. A portion of the panel extending between the adjacent V-shaped elements has an opening formed therein which defines a handle for carrying the filter frame.

In one embodiment, a rib is disposed on the first side of the panel between the slots of each V-shaped element extending along the line passing through a vertex of the V-shaped element and normal to a base of the panel for reinforcing the panel. In another embodiment, a rail is disposed on a second side of the panel at a base thereof having an extent greater than the base. In still another embodiment, a connector is disposed at each end of the rail extending toward the first side of the panel. In yet another embodiment, each slot is defined by a plurality of flanges extending from the first side of the panel. In still yet another embodiment, the slots of each V-shaped element are disposed at a relative angle of less than 180 degrees. In a still yet further embodiment, the handle further includes a support element normal to the panel and extending toward the first or second side of the panel between the V-shaped elements. In yet another still further embodiment, the slots of each V-shaped element are configured to define a continuous channel. In another embodiment, each slot of each V-shaped element is defined by four flanges extending from the first side of the panel configured as a trapezoid.

Another principal aspect of the present invention is directed to a filter assembly including a pair of filter frames engaging opposite ends of a plurality of filter elements. Each filter frame includes a panel including a plurality of V-shaped elements disposed on a first side of the panel. Each V-shaped element includes a pair of slots where each slot is configured to receive and orient one end of a filter element. A portion of the panel disposed between each adjacent pair of V-shaped elements has an opening formed therein to define a handle for carrying the filter frame. A pair of transverse members space and interconnect the filter frames.

In one embodiment, a rib is disposed on the first side of the panel between the slots of each V-shaped element extending along the line passing through a vertex of the V-shaped element and normal to a base of the panel for reinforcing the panel. In another embodiment, a rail is disposed on a second side of the panel at a base thereof having an extent greater than the base. In still another embodiment, a connector is disposed at each end of the rail extending toward the first side of the panel. In yet another embodiment, each slot is defined by a plurality of flanges extending from the first side of the panel. In still yet another embodiment, the slots of each V-shaped element are disposed at a relative angle of less than 180 degrees. In a still yet further embodiment, the handle further includes a support element normal to the panel and extending toward the first or second side of the panel between the V-shaped elements. In yet another still further embodiment, the slots of each V-shaped element are configured to define a continuous channel. In another embodiment, each slot of each V-shaped element is defined by four flanges extending from the first side of the panel configured as a trapezoid.

FIG. 1 is a first side perspective view of the filter frame 10 of an embodiment of the present invention. The filter frame 10 includes a panel 12 having a first side 14 and a second side 16 (see FIG. 2). A plurality of V-shaped elements 18 are disposed on the first side 14 of panel 12. In this embodiment, the panel 12 is generally W-shaped. It will be recognized that the panel 12 may take any shape or form such that the plurality of V-shaped elements 18 may be disposed thereupon.

Each V-shaped element 18 includes a pair of slots 20. Each slot 20 is defined by a plurality of flanges 22, 24, 26, 28 extending from the first side 14 of the panel 12. The slots 20 of each V-shaped element 18 are disposed at a relative angle γ of less than 180 degrees. It will be recognized that the relative angle γ between each of the V-shaped elements 20 may be configured as desired for certain applications.

A rib 21 disposed on the first side 14 of the panel 12 between the slots 20 of each V-shaped element 18 extending along a line 42 passing through a vertex 44 of the V-shaped element 18 and normal to a base 32 of the panel 12 for reinforcing the panel 12.

Figure 2:
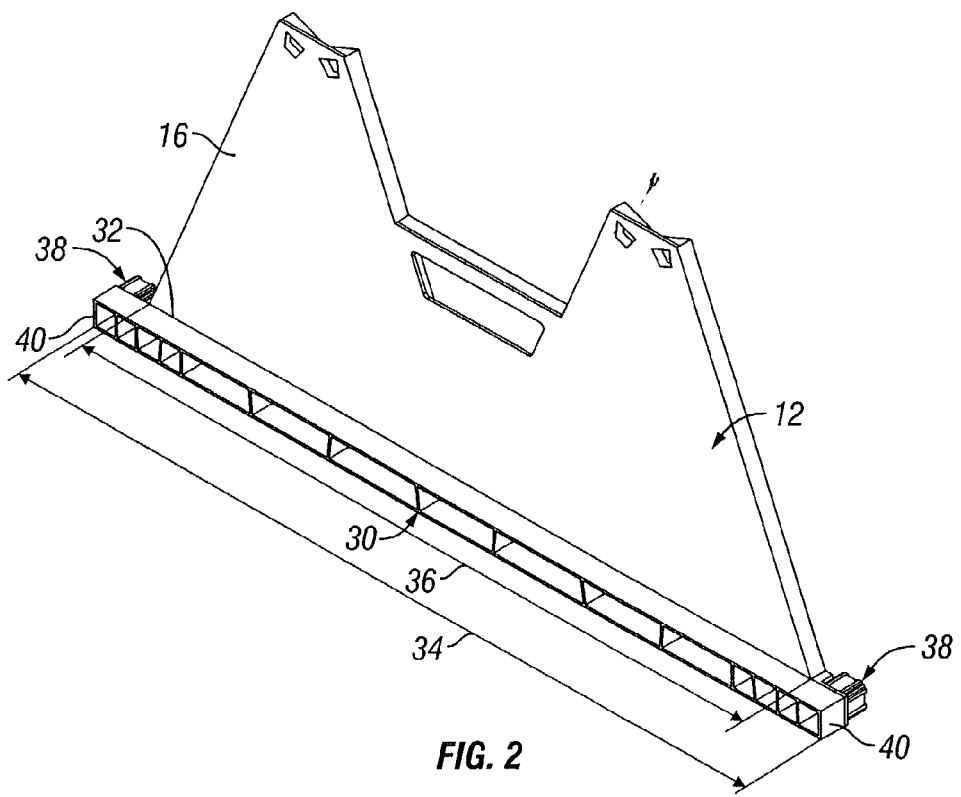
FIG. 2 is a second side perspective view of the filter frame of FIG. 1.

FIG. 2 is a second side perspective view of the filter frame of FIG. 1. The panel 12 has a second side 16. A rail 30 is disposed on the second side 16 of the panel 12 at a base 32 (see also FIG. 1) thereof and has an extent 34 greater than the extent 36 of the base 32. A connector 38 is disposed at each end 40 of the rail 30, beyond the extent 36 of the base 32, and extends toward the first side of the panel 12.

Figure 3:
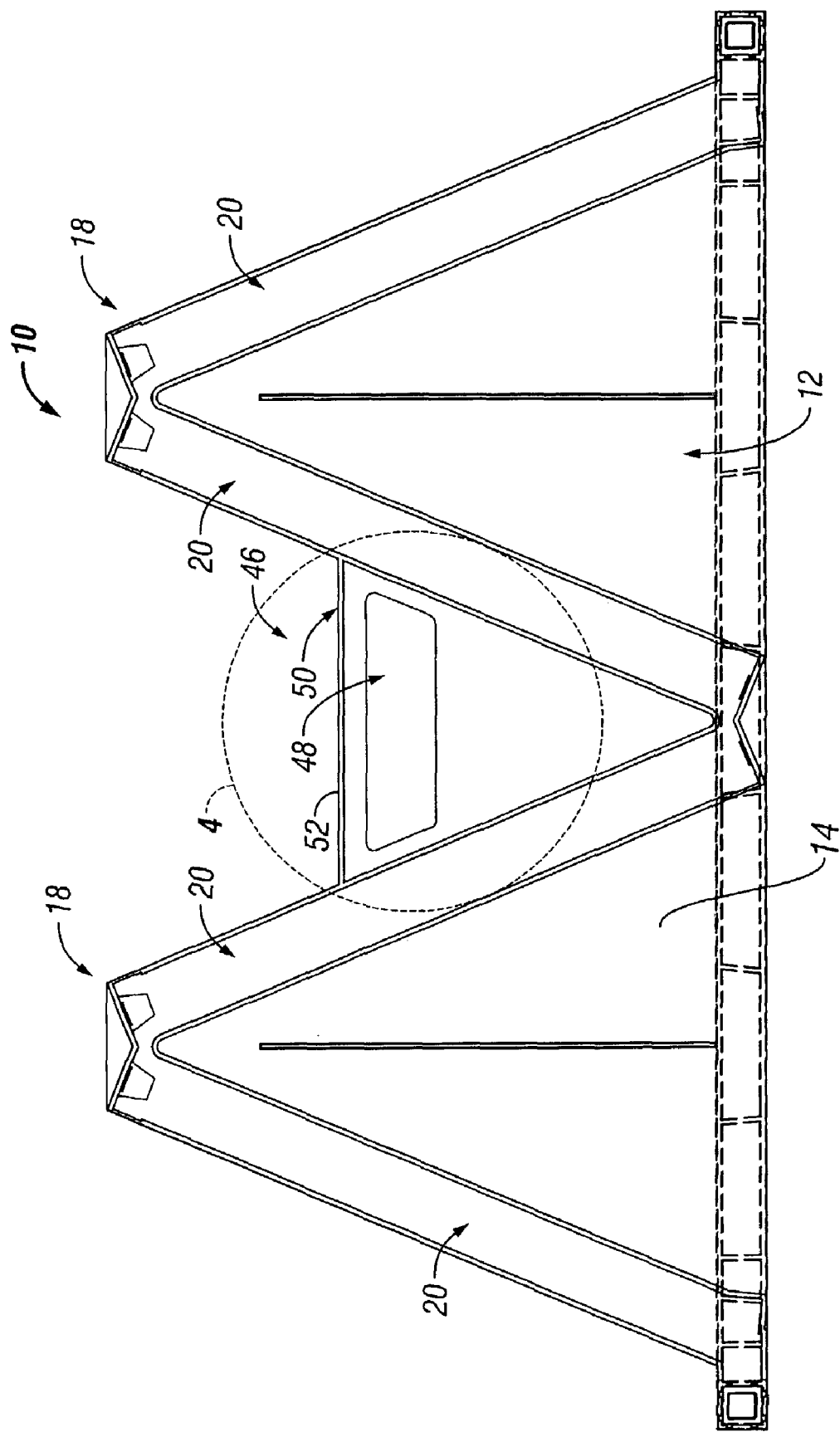
FIG. 3 is a first side elevation view of the filter frame of FIG. 1.
Figure 4:
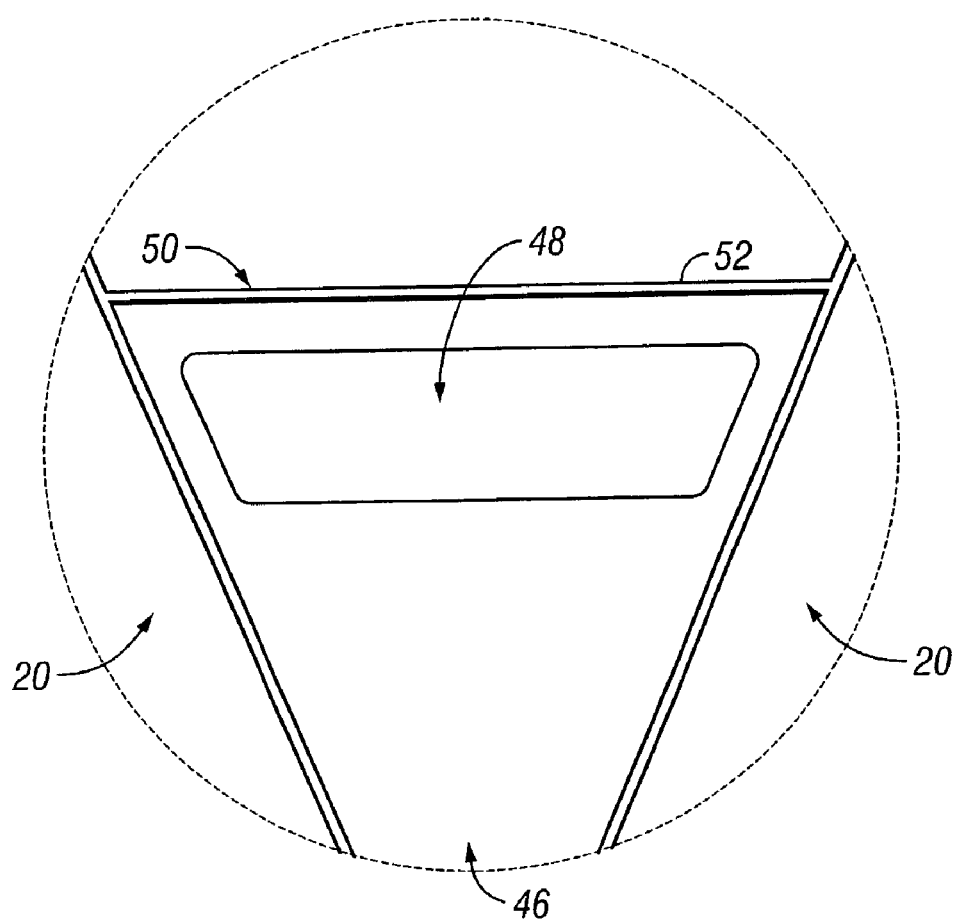
FIG. 4 is a detailed view of a highlighted portion indicated as No. 4 on FIG. 3.

FIG. 3 is a first side elevation view of the filter frame of FIG. 1 and FIG. 4 is a detailed view of a highlighted portion indicated as No. 4 on FIG. 3. A portion 46 of the panel 12 disposed between adjacent pairs of V-shaped elements 18 has an opening 48 formed therein to define a handle 50 for carrying the filter frame 10. The handle 50 includes a support element 52 normal to the panel 12 and extending toward the first side 14 of the panel between the V-shaped elements 18. It will be recognized that the support element 52 may also extend toward the second side of the panel between the V-shaped elements and provide identical functionality.

The slots 20 of each V-shaped element 18 may be configured to define a continuous channel, as shown in FIGS. 1 and 3. It will be recognized that such configuration increases the ease of manufacture. Alternatively, each slot 20 of each V-shaped element 18 is defined by four flanges 22, 24, 26, 28 extending from the first side of the panel 12 configured as an enclosed area, such as a trapezoid, parallelogram, rectangle or any other suitable form.

Figure 5:
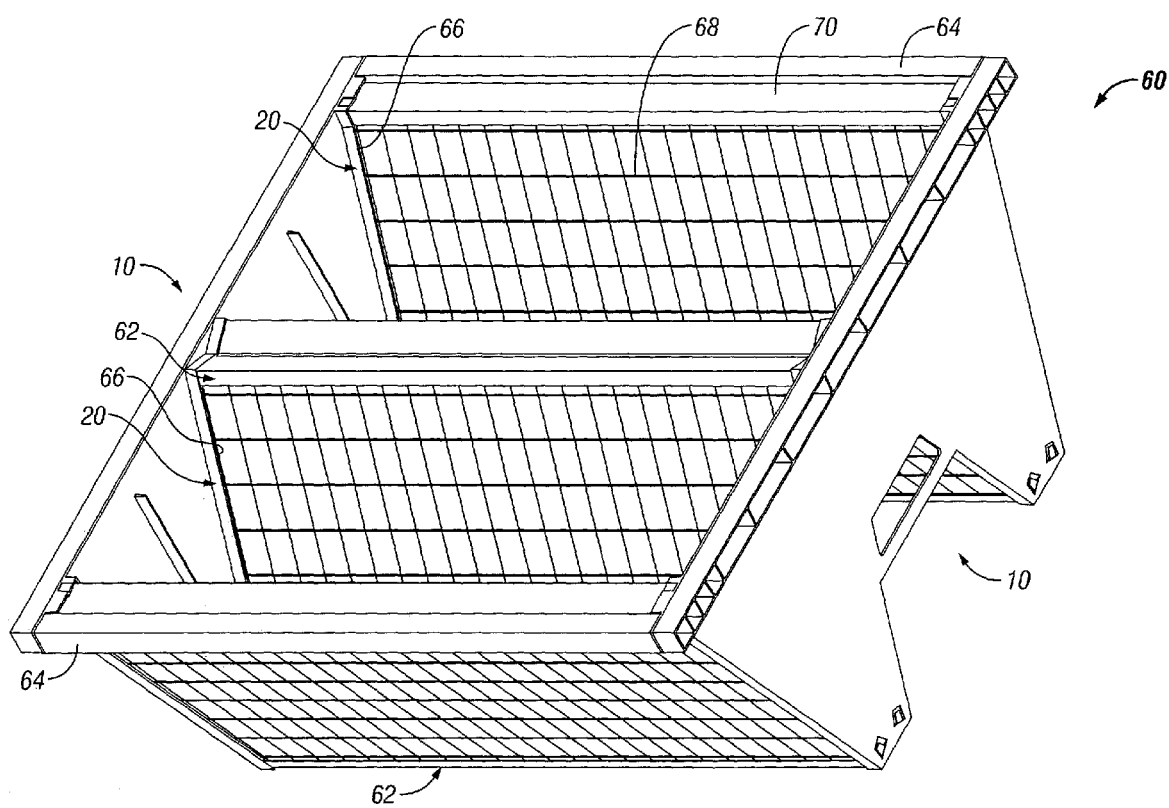
FIG. 5 is a top perspective view of a filter frame assembly in accordance with one embodiment of the present invention.
Figure 6:
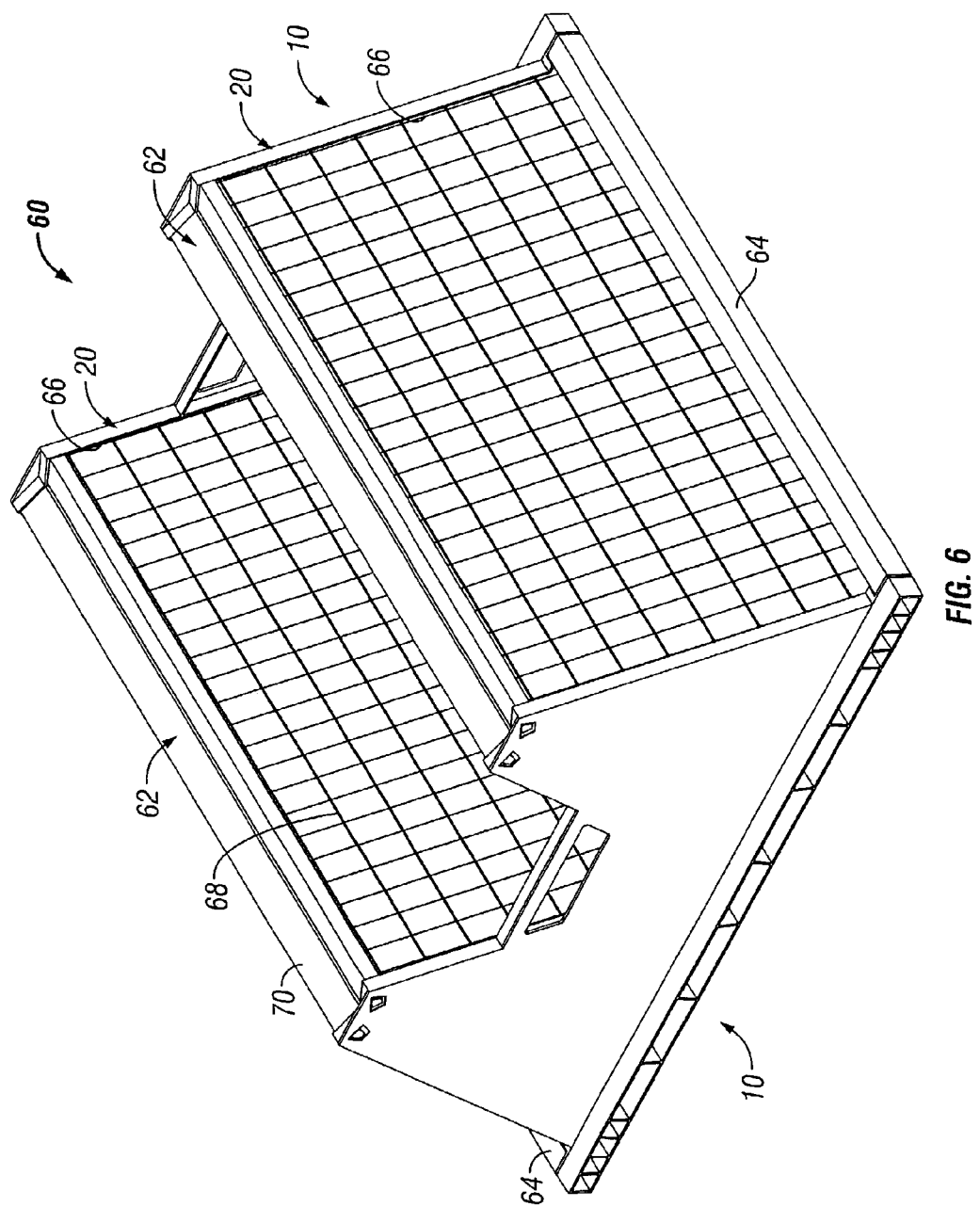
FIG. 6 is a bottom perspective view of the filter frame assembly of FIG. 5.

FIGS. 5 and 6 are, respectively, top and bottom perspective views of a filter frame assembly 60 of one embodiment of the present invention. A filter assembly 60 includes a pair of filter frames 10 engaging opposite ends of a plurality of filter elements 62. The structural elements and the configuration thereof for each filter frame 10 are as described above. A pair of elongated members 64 space and interconnect the filter frames 10. Each end 66 of the filter element is received within a slot 20 which positions and orients the filter element 62. The filter elements 62 include a filter media 68 and a frame 70. It will be recognized by those of skill in that art that the filter media 68 may be, of any suitable design and composition. For example, the filter media 68 may be accordion-fold of a standard filtering material, such as wet-laid fiberglass paper or any other suitable material.

The elongated member 64 may be configured as a square tube having a through bore which engages the connecters disposed on the ends of the rail in a conventional manner. It will be recognized by those of skill in the art that the elongated members may take any structural and functional configuration which cooperatively engages the connectors to retain the filter frames 10 in a spaced and interconnected relationship. For example, the elongated member 64 may be configured as a round tube, a solid bar, a flat bar or any other suitable structural configuration made of any material as desired.

As shown in the disclosed embodiment, the filter frame and filter assembly of the present invention provides a structural configuration for carrying the filter assembly which is inexpensive and easy to manufacture.

The invention is not limited to the details of the apparatus depicted and other modifications and applications may be contemplated. For example, the relative angle between the V-shaped elements may be changed as desired. For further example, additional filter elements may be added to the filter assembly. Also, the size, shape and position of the opening may be altered as desired to suit particular applications. Certain other changes may be made in the above-described apparatus without departing from the true spirit and scope of the invention here involved. It is intended, therefore that the subject matter of the above depiction shall be interpreted as illustrated and not in a limiting sense.

What is claimed is:

1. A filter frame comprising:
  a panel including a plurality of V-shaped elements disposed on a first side of the panel;
  each V-shaped element including a pair of slots;
  the slots each configured to receive and orient a filter element; and
  a portion of the panel disposed between each adjacent pair of V-shaped elements having an opening formed therein to define a handle for carrying the filter elements.

2. The filter frame as recited in claim 1, wherein a rib is disposed on the first side of the panel between the slots of each V-shaped element extending along a line passing through a vertex of the V-shaped element and normal to a base of the panel for reinforcing the panel.

3. The filter frame as recited in claim 1, wherein a rail is disposed on a second side of the panel at a base thereof having an extent greater than the base.

4. The filter frame as recited in claim 3, wherein a connector is disposed at each end of the rail extending toward the first side of the panel.

5. The filter frame as recited in claim 1, wherein each slot is defined by a plurality of flanges extending from the first side of the panel.

6. The filter frame as recited in claim 1, wherein the slots of each V-shaped element are disposed at a relative angle of less than one hundred eighty degrees.

7. The filter frame as recited in claim 1, wherein the handle further includes a support element normal to the panel and extending toward the first side of the panel between the V-shaped elements.

8. The filter frame as recited in claim 1, wherein the handle further includes a support element normal to the panel and extending toward a second side of the panel between the V-shaped elements.

9. The filter frame as recited in claim 1, wherein the slots of each V-shaped element are configured to define a continuous channel.

10. The filter frame as recited in claim 1, wherein each slot of each V-shaped element is defined by four flanges extending from the first side of the panel configured as an enclosed area.

11. A filter frame comprising:
a generally W-shaped panel including a pair of V-shaped elements disposed on a first side of the panel;
each V-shaped element including a pair of slots configured to receive and orient a pair of filters elements; and
a portion the panel extending between adjacent V-shaped elements having an opening formed therein which defines a handle for carrying the filters.

12. The filter frame as recited in claim 11, wherein a rib is disposed on the first side of the panel between the slots of each V-shaped element extending along a line passing through a vertex of the V-shaped element and normal to a base of the panel for reinforcing the panel.

13. The filter frame as recited in claim 11, wherein a rail is disposed on a second side of the panel at a base thereof having an extent greater than the base.

14. The filter frame as recited in claim 13, wherein a connector is disposed at each end of the rail extending toward the first side of the panel.

15. The filter frame as recited in claim 11, wherein each slot is defined by a plurality of flanges extending from the first side of the panel.

16. The filter frame as recited in claim 11, wherein the slots of each V-shaped element are disposed at a relative angle of less than one hundred eighty degrees.

17. The filter frame as recited in claim 11, wherein the handle further includes a support element normal to the panel and extending toward the first side of the panel between the V-shaped elements.

18. The filter frame as recited in claim 11, wherein the handle further includes a support element normal to the panel and extending toward a second side of the panel between the V-shaped elements.

19. The filter frame as recited in claim 11, wherein the slots of each V-shaped element are configured to define a continuous channel.

20. The filter frame as recited in claim 11, wherein each slot of each V-shaped element is defined by four flanges extending from the first side of the panel configured as an enclosed area.

21. A filter assembly comprising:
a pair of filter frames engaging opposite ends of a plurality of filter elements;
each filter frame comprising a panel including a plurality of V-shaped elements disposed on a first side of the panel; each V-shaped element including a pair of slots; the slots each configured to receive and orient one end of one of the filter elements; and a portion the panel disposed between each adjacent pair of V-shaped elements having an opening formed therein to define a handle for carrying the filter assembly; and
a pair of elongated members for spacing and interconnecting the filter frames.

22. The filter assembly as recited in claim 21, wherein a rib is disposed on the first side of the panel between the slots of each V-shaped element extending along a line passing through a vertex of the V-shaped element and normal to a base of the panel for reinforcing the panel.

23. The filter assembly as recited in claim 21, wherein a rail is disposed on a second side of the panel at a base thereof having an extent greater than the base.

24. The filter assembly as recited in claim 23, wherein a connector is disposed at each end of the rail extending toward the first side of the panel for engaging one of the bars.

25. The filter assembly as recited in claim 21, wherein each slot is defined by a plurality of flanges extending from the first side of the panel.

26. The filter assembly as recited in claim 21, wherein the slots of each V-shaped element are disposed at a relative angle of less than one hundred eighty degrees.

27. The filter assembly as recited in claim 21, wherein the handle further includes a support element normal to the panel and extending toward the first side of the panel between the V-shaped elements.

28. The filter frame as recited in claim 21, wherein the handle further includes a support element normal to the panel and extending toward a second side of the panel between the V-shaped elements.

29. The filter assembly as recited in claim 21, wherein the slots of each V-shaped element are configured to define a continuous channel.

30. The filter assembly as recited in claim 21, wherein the filter elements each include a filter media connected to a frame.

31. The filter frame as recited in claim 21, wherein each slot of each V-shaped element is defined by four flanges extending from the first side of the panel configured as an enclosed area.

* * * * *